US010671814B2

(12) United States Patent
Hayashi et al.

(10) Patent No.: US 10,671,814 B2
(45) Date of Patent: Jun. 2, 2020

(54) TRANSLATION DEVICE AND PROGRAM RECORDING MEDIUM

(71) Applicant: Panasonic Intellectual Property Management Co., Ltd., Osaka (JP)

(72) Inventors: Takayuki Hayashi, Kyoto (JP); Tomokazu Ishikawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 192 days.

(21) Appl. No.: 15/723,696

(22) Filed: Oct. 3, 2017

(65) Prior Publication Data

US 2018/0039625 A1    Feb. 8, 2018

Related U.S. Application Data

(63) Continuation of application No. PCT/JP2016/004155, filed on Sep. 13, 2016.

(30) Foreign Application Priority Data

Mar. 25, 2016  (JP) .................. 2016-062353

(51) Int. Cl.
*G06F 40/58* (2020.01)
*G06F 40/45* (2020.01)
(Continued)

(52) U.S. Cl.
CPC ............ *G06F 40/51* (2020.01); *G06F 40/242* (2020.01); *G06F 40/58* (2020.01); *G10L 15/22* (2013.01); *G10L 13/00* (2013.01); *G10L 15/26* (2013.01)

(58) Field of Classification Search
CPC .. G06F 17/28; G06F 17/2809; G06F 17/2818; G06F 17/2827; G06F 17/2836;
(Continued)

(56) References Cited

U.S. PATENT DOCUMENTS 7,536,293 B2 * 5/2009 Zhuo ................ G06F 17/289
704/2
8,838,434 B1 * 9/2014 Liu ................... G06F 17/289
704/2
(Continued)

FOREIGN PATENT DOCUMENTS

| JP | 4-319769 | 11/1992 |
|---|---|---|
| JP | 8-221422 | 8/1996 |
| WO | 2013/014877 | 1/2013 |

OTHER PUBLICATIONS

International Search Report issued in International Application No. PCT/JP2016/004155 dated Dec. 6, 2016.
(Continued)

*Primary Examiner* — Lamont M Spooner
(74) *Attorney, Agent, or Firm* — Wenderoth, Lind & Ponack, L.L.P.

(57) ABSTRACT

A translation device includes an input unit, a controller, a notification unit, an output unit, and a memory. The input unit inputs an utterance of a speaker to generate utterance data. The controller determines accuracy of a translation result when translated utterance data from the utterance data is obtained. The notification unit notifies the speaker of the determination result of the controller. The output unit outputs a translated utterance according to the translated utterance data. The memory stores dictionary data associating utterance data with translated utterance data. The controller performs translation based on the dictionary data. When the controller determines that the accuracy of the translation result is lower than a predetermined value, the controller controls the output unit not to output the translated utterance, and controls the notification unit to issue a notification regarding the determination result.

6 Claims, 6 Drawing Sheets

(51) Int. Cl.
*G06F 40/51* (2020.01)
*G06F 40/242* (2020.01)
*G10L 15/22* (2006.01)
*G10L 13/00* (2006.01)
*G10L 15/26* (2006.01)

(58) Field of Classification Search
CPC ............. G06F 17/2845; G06F 17/2854; G06F 17/2863; G06F 17/2872; G06F 17/289; G06F 17/2881
USPC ......................................................... 704/2, 8
See application file for complete search history.

(56) References Cited

U.S. PATENT DOCUMENTS

| | | | | |
|---|---|---|---|---|
| 8,924,195 | B2 * | 12/2014 | Kamatani | G06F 17/2827 704/2 |
| 2004/0102201 | A1 * | 5/2004 | Levin | G06F 17/2845 455/466 |
| 2004/0102956 | A1 * | 5/2004 | Levin | H04L 51/066 704/2 |
| 2004/0102957 | A1 * | 5/2004 | Levin | G06F 17/2845 704/3 |
| 2004/0148381 | A1 * | 7/2004 | Beppu | G06F 17/2735 709/223 |
| 2007/0016401 | A1 * | 1/2007 | Ehsani | G06F 17/2872 704/9 |
| 2007/0083374 | A1 * | 4/2007 | Bates | G10L 15/197 704/257 |
| 2008/0077391 | A1 * | 3/2008 | Chino | G06F 17/2827 704/7 |
| 2012/0284015 | A1 * | 11/2012 | Drewes | G06F 17/2818 704/3 |
| 2014/0201631 | A1 * | 7/2014 | Pornprasitsakul | G06F 3/0484 715/716 |
| 2014/0337989 | A1 * | 11/2014 | Orsini | H04L 51/12 726/26 |
| 2014/0358524 | A1 * | 12/2014 | Papula | G06F 17/2854 704/9 |
| 2015/0081270 | A1 * | 3/2015 | Kamatani | G06F 17/289 704/2 |
| 2015/0179173 | A1 * | 6/2015 | Cho | G06F 17/2735 704/235 |
| 2015/0199340 | A1 * | 7/2015 | Kwon | G06F 17/289 704/2 |
| 2017/0161264 | A1 * | 6/2017 | Zhao | G06F 17/289 |

OTHER PUBLICATIONS

International Preliminary Report on Patentability and Written Opinion of the International Searching Authority dated Oct. 4, 2018 in International (PCT) Application No. PCT/JP2016/004155.

* cited by examiner

|  | FIRST TIME (n = 1) | SECOND TIME (n = 2) |
|---|---|---|
| SPEECH UTTERANCE ($A_n$) | A1: これなんぼ？<br>(KORE NANBO ?) | A2: これはいくらですか？<br>(KORE HA IKURA DESUKA ?) |
| UTTERANCE DATA ($a_n$) | a1: これなんぼ？<br>(KORE NANBO ?) | a2: これはいくらですか？<br>(KORE HA IKURA DESUKA ?) |
| TRANSLATED UTTERANCE DATA ($b_n$) | b1: This *** | b2: How much is this ? |
| DEGREE OF RELIABILITY ($\alpha_n$) | $\alpha$1: 20% | $\alpha$2: 100% |

FIG. 6A

| UTTERANCE DATA | UTTERANCE DATA | TRANSLATED UTTERANCE DATA |
|---|---|---|
| ... |  | ... |
| これはいくらですか？<br>(KORE HA IKURA DESUKA ?) |  | How much is this ? |
| ... |  | ... |

FIG. 6B

| UTTERANCE DATA | UTTERANCE DATA | TRANSLATED UTTERANCE DATA |
|---|---|---|
| ... |  | ... |
| これはいくらですか？<br>(KORE HA IKURA DESUKA ?) | これなんぼ？<br>(KORE NANBO ?) | How much is this ? |
| ... |  | ... |

FIG. 7

TRANSLATION DEVICE AND PROGRAM RECORDING MEDIUM

BACKGROUND

1. Technical Field

The present disclosure relates to a translation device for translating an utterance (first language) into a translated utterance (second language different from the first language).

2. Related Art

JP 4-319769 A discloses a translation system that performs translation by using an automatic translation function of a calculator. The translation system each time translates an input language that is input by a first person through a language input unit into a translated language for a second person by a translation transformation unit, performs re-translation into a translated language for the first person by a re-translation transformation unit and presents the re-translated language to the first person through a returned language output unit. The first person is thereby enabled to check whether the translated language for the second person is translated with accurate expression/context every time. Further, when the expression content is not as intended, the first person may again input the input language using a different expression that is convenient for translation interpretation. Accordingly, use of wording that is convenient for translation interpretation may be easily secured while preventing one from feeling unease as to whether accurate translation is performed for the other party.

SUMMARY

The present disclosure provides a translation device which increases the translation accuracy.

A translation device according to the present disclosure includes an input unit for inputting an utterance of a speaker to generate utterance data, a controller for determining accuracy of a translation result when translated utterance data from the utterance data is obtained, a notification unit for notifying the speaker of the determination result of the controller, an output unit for outputting a translated utterance according to the translated utterance data, and a memory for storing dictionary data associating utterance data with translated utterance data. The controller performs translation based on the dictionary data. When the controller determines that the accuracy of the translation result is lower than a predetermined value, the controller controls the output unit not to output the translated utterance, and controls the notification unit to issue a notification regarding the determination result. When the controller determines that the accuracy of the translation result is more than or equal to the predetermined value, the controller updates the dictionary data by associating all pieces of utterance data generated until translated utterance data for which the accuracy of the translation result is more than or equal to the predetermined value is obtained, with the obtained translated utterance data.

The translation device according to the present disclosure is capable of increasing the translation accuracy.

DESCRIPTION OF EMBODIMENTS

In the following, embodiments will be described in detail with reference to the drawings as appropriate. However, excessively detailed description may be omitted. For example, description concerning details of matters already well known or repeated description for substantially identical configurations may be omitted. These omissions are made for avoiding redundancy in the following description, and for helping those skilled in the art easily understand the description.

Moreover, the inventor(s) provide(s) the accompanying drawings and the following description only for the purpose of helping those skilled in the art sufficiently understand the present disclosure, and therefore do(es) not intend to limit the subject matters of the appended claims by the drawings and the description.

First Embodiment

In the following, a first embodiment will be described with reference to FIGS. 1 to 6A and 6B.
<1-1. Configuration>
<1-1-1. Physical Configuration of Translation Device>

Figure 1:
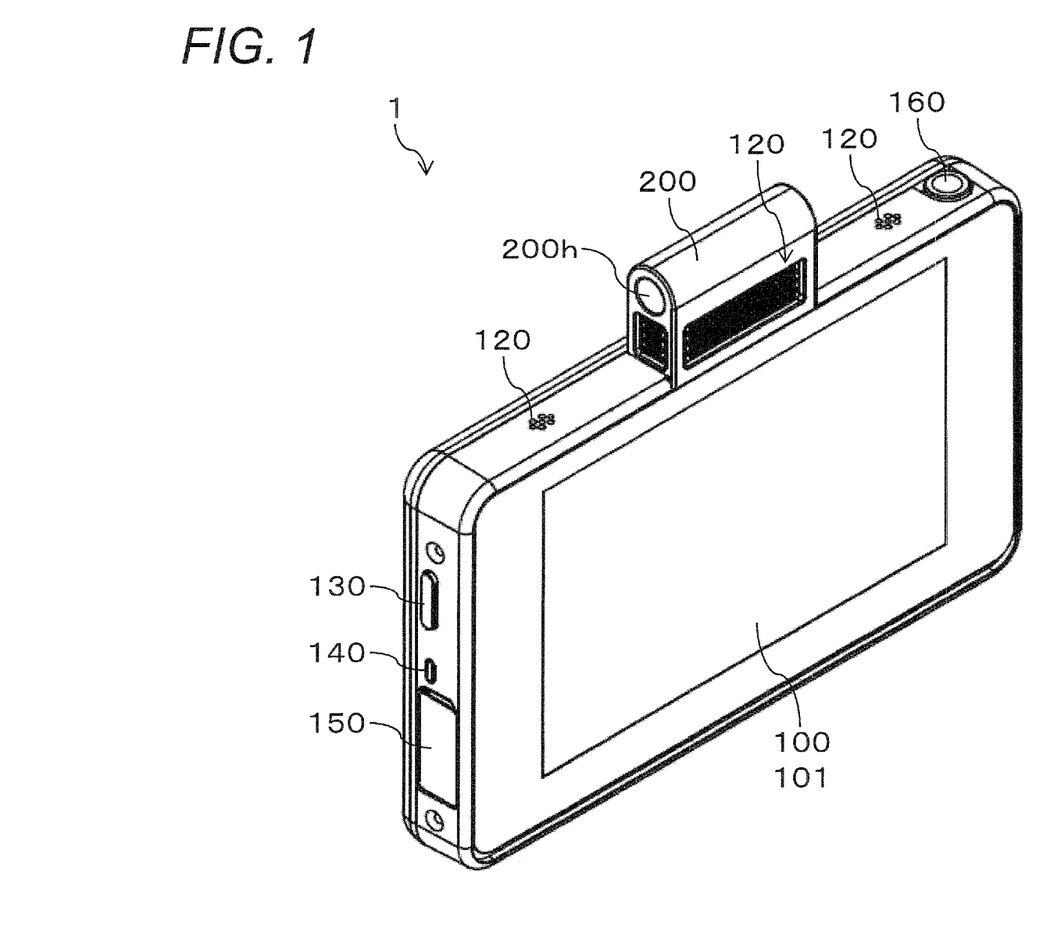
FIG. 1 is a perspective view showing an external appearance of a translation device according to a first embodiment.
Figures 2A, 2C:
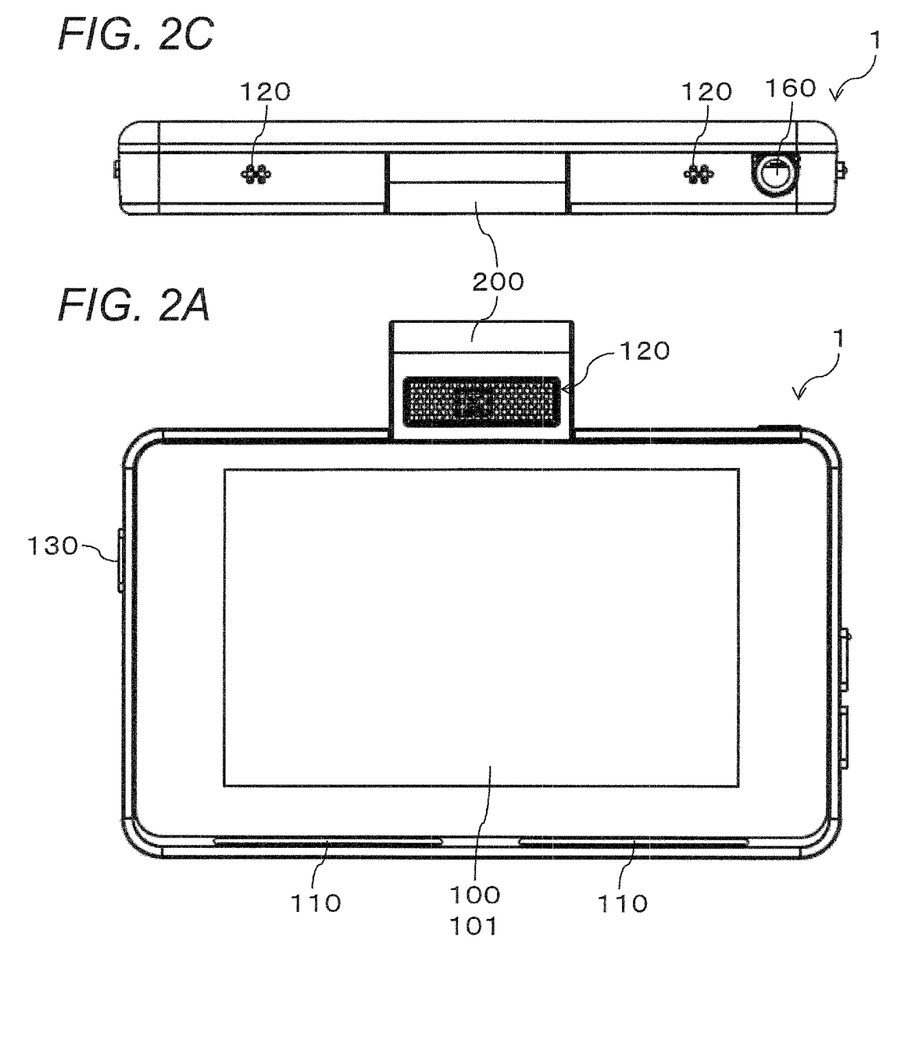
FIGS. 2A to 2C are a front view, a side view, and a plan view showing the external appearance of the translation device according to the first embodiment.
Figure 2B:
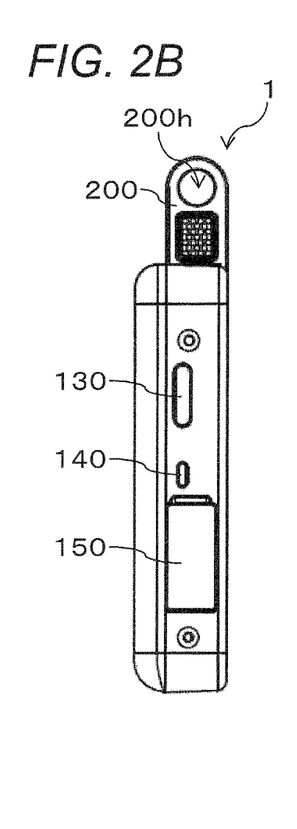

FIG. 1 is a perspective view showing an external appearance of a translation device according to the first embodiment, and FIGS. 2A to 2C are a front view, a side view, and a plan view showing the external appearance of the translation device according to the first embodiment. On a front surface side of a translation device 1, a liquid crystal display (display unit) 100, a capacitive touch panel (operation unit) 101, and opening sections 110 for speaker units are provided. The display 100 and the touch panel 101 will be described in detail in the description of an electrical configuration of the translation device given below. Speaker units, described below, are provided inside the translation device 1, in a corresponding manner with the opening sections 110 for speaker units.

A strap attachment section 200 is provided on an upper surface side of the translation device 1, and the translation device 1 may be hung around the neck of a user by using a strap attached to a through hole 200h of the attachment section 200. Opening sections 120 for microphones are provided on the upper surface side of the translation device 1 and on a front surface side of the attachment section 200. Microphones, described below, are provided inside the translation device 1, in a corresponding manner with the opening sections 120 for microphones.

A power switch 130 and an LED 140 are provided on a left side surface of the translation device 1. The power switch 130 is a switch for turning on/off the power of the translation device 1. The LED 140 will be described in detail in the description of the electrical configuration of the translation device given below.

Furthermore, an USB terminal connection section 150 is provided on the left side surface of the translation device 1, and a headphone terminal connection section 160 is provided on the upper surface side of the translation device 1.

<1-1-2. Electrical Configuration of Translation Device>

Figure 3:
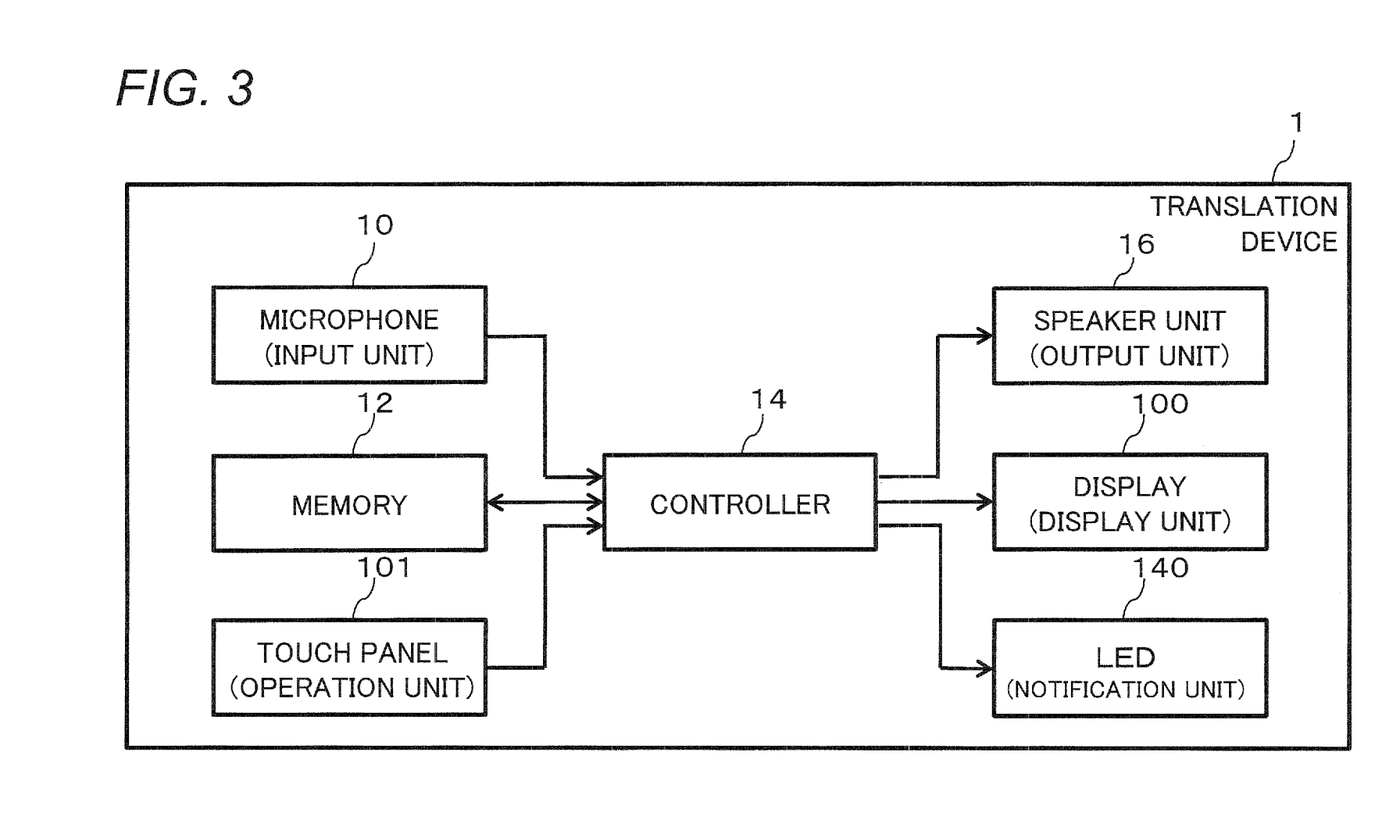
FIG. 3 is a block diagram showing an electrical configuration of the translation device according to the first embodiment.

FIG. 3 is a block diagram showing an electrical configuration of the translation device according to the first embodiment. The translation device 1 receives audio-input of an utterance in a first language (such as Japanese) by a speaker, translates the utterance into a translated utterance in a second language (such as English) by referring to a translation dictionary, and audio-outputs the translated utterance. At this time, if the accuracy of the translation result is low, the translation device 1 does not output the translated utterance but notifies the speaker that the accuracy of the translation result is low, and thus prompts the speaker to make the utterance again using a different expression until the accuracy of the translation result is increased to or above a predetermined value. Then, when the accuracy of the translation result is increased by the re-utterance, the translation device 1 outputs the translated utterance. Moreover, the translation device 1 updates the translation dictionary by associating data indicating all the utterances uttered by the speaker until a translated utterance with high accuracy of translation result is obtained, with data indicating the translated utterance. Hereinafter, an utterance means an act of speaking and the speech sound, and a translated utterance means a speech indicating a sentence which is the translation result. The translation device 1 includes a microphone (input unit) 10, a memory 12, a controller 14, a speaker unit (output unit) 16, a display (display unit) 100, a touch panel (operation unit) 101, and an LED (notification unit) 140.

The microphone 10 is a device for converting a sound into an electrical signal. The microphone 10 receives audio-input of an utterance by a speaker, and converts the speech sound into an electrical signal (speech waveform). As the microphone 10, a microphone with high directivity is used so as to reduce pick-up of noise other than the speech of a speaker. The microphone 10 is an exemplary input unit allowing input of an utterance of a speaker.

Figure 6A:
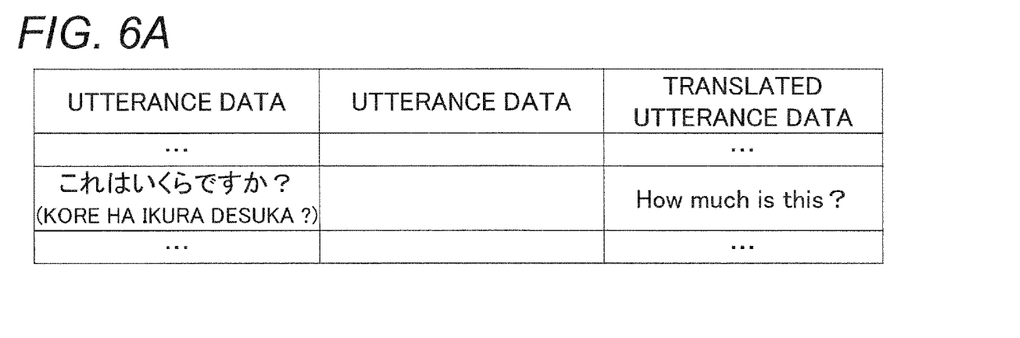
FIGS. 6A and 6B are a diagram showing an example of information in a translation dictionary before update and a diagram showing an example of information in the translation dictionary after update.
Figure 6B:
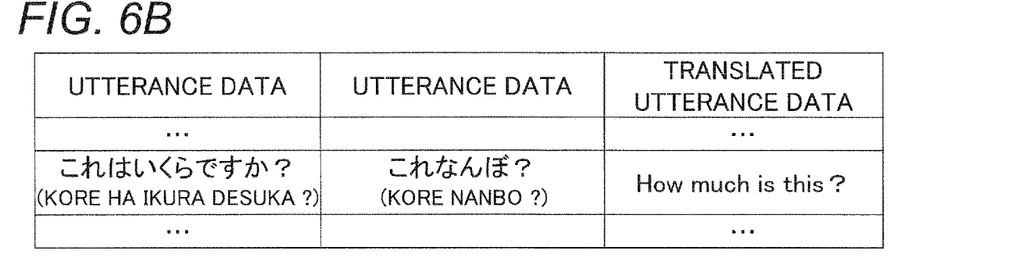

The memory 12 is a storage element, and is configured by a flash memory, a ferroelectric memory, an HDD, or an SDD, for example. The memory 12 stores reference tables for speech recognition and speech synthesis, for each of a plurality of languages. The reference table for speech recognition is a table associating text data and characteristics of the corresponding speech waveform (for example, an acoustic model as acoustic characteristics or a language model as language characteristics, described below). The reference table for speech synthesis is a table associating text data and characteristics of the corresponding speech waveform. Furthermore, the memory 12 stores a plurality of translation dictionaries which are used for translation, for respective types of language translation (for example, language translation from Japanese into English or language translation from English into Japanese). The translation dictionary is a dictionary associating utterance data of a character string (text data) and translated utterance data of the character string (see FIG. 6 described below and description thereof).

In the present embodiment, the translation dictionary stores and updates the utterance data and the translated utterance data on a per-sentence basis. Moreover, the memory 12 stores various programs to be used by the controller 14.

The controller 14 is configured by a CPU, an MPU or the like, and controls the entire translation device 1 by executing various programs stored in the memory 12. The controller 14 inputs an electrical signal (speech waveform) from the microphone 10, generates utterance data of the character string by performing speech recognition, and translates the utterance data into translated utterance data of the character string. Furthermore, the controller 14 determines the accuracy of the translation result, and controls the illumination color of the LED 140 according to the determination result. Furthermore, the controller 14 controls update of the translation dictionary in the memory 12 according to the determination result. Still further, the controller 14 performs speech synthesis on the translated utterance data to generate an electrical signal (speech waveform), and controls the speaker unit 16 to audio-output the translated utterance. Moreover, the controller 14 generates a text image for displaying the translated utterance data, and controls the display 100 to display the text image.

Although the functions of the controller 14 can be realized by combination of hardware and software, the controller 14 may alternatively be realized only by a dedicated hardware circuit which is designed to realize a predetermined function. For example, the controller 14 may be configured by not only a CPU and an MPU, but by a DSP, an FPGA, an ASIC and the like.

The speaker unit 16 is a device for converting an electrical signal into sound. The speaker unit 16 outputs, as a translated utterance, a speech sound which is based on an electrical signal (speech waveform) from the controller 14. The speaker unit 16 is an exemplary output unit for outputting a translated utterance (speech indicating translated contents). Moreover, the translated utterance may be output by connection to an external speaker unit through the headphone terminal connection section 160.

The display 100 is a device for displaying images. The display 100 displays text images from the controller 14. Also, the display 100 displays a selection screen for an utterance language and a translated utterance language, under the control by the controller 14. Moreover, the display 100 displays an operation screen for utterance start, such as an "utterance switch".

The touch panel 101 functions as various operation units, such as a selector switch for the utterance language and the translated utterance language and the utterance switch. The selector switch for the utterance language and the translated utterance language is a switch for switching, in coordination with the display contents on the display 100, between translation from Japanese into English and translation from English into Japanese, For example. The utterance switch is a switch for notifying the translation device 1 of start of utterance, in coordination with the display contents on the display 100 after switching of the utterance language and the translated utterance language.

The LED 140 is illuminated green or red based on a command from the controller 14. For example, the LED 140 indicates the accuracy of a translation result by the illumination color. For example, in the case where the LED 140 is illuminated green, a state where the accuracy of a translation result is high and output of the translation result is allowed is indicated, and in the case where the LED 140 is illuminated red, it is indicated that the accuracy of a translation result is low and that the user is urged to make an utterance again. The LED 140 is an exemplary notification unit for notifying the speaker of the accuracy of a translation result. A notification regarding the accuracy of a translation result may be displayed on the display 100.

<1-2. Operation>

Figure 4:
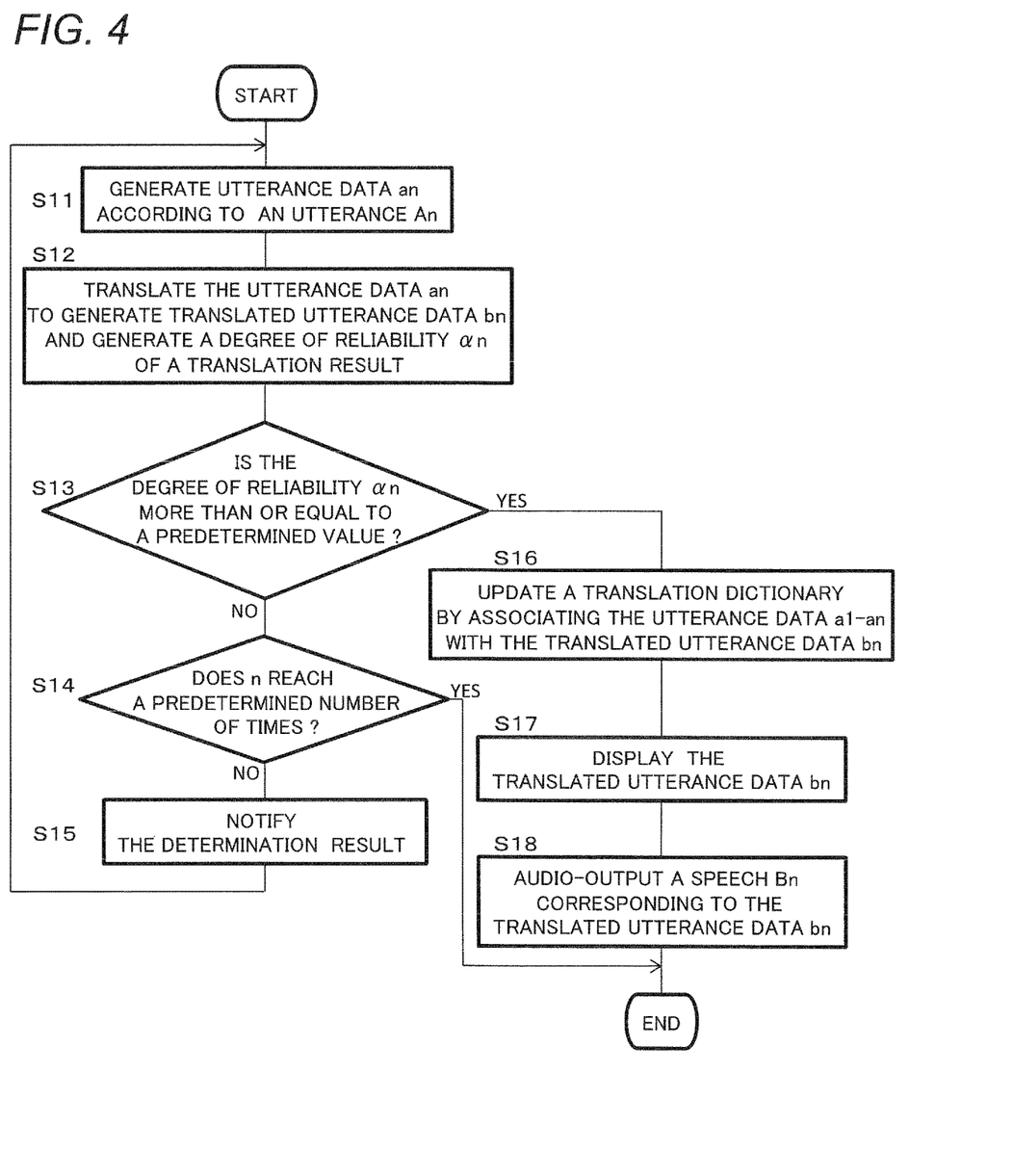
FIG. 4 is a flowchart of translation operation of a controller of the translation device according to the first embodiment.

Operation of the translation device 1 configured in the above will be described below. FIG. 4 is a flowchart of translation operation of the controller 14 of the translation device 1. In the following description, "n" indicates number of times of input of an utterance. "An" indicates an n-th utterance, and "an", "bn", "αn", and "Bn" respectively indicate utterance data, translated utterance data, degree of reliability of a translation result, and a translated utterance, each corresponding to the n-th utterance. The utterance An is a speech of a speaker. The utterance data an is data of a character string (text data) obtained by performing a speech recognition process on the utterance An. The translated utterance data bn is data of the character string (text data). The translated utterance Bn is a speech that is output from the speaker unit 16 by performing a speech synthesis process on the translated utterance data bn.

First, the controller 14 causes the display 100 to display the selection screen for an utterance language and a translated utterance language. A speaker operates the touch panel 101 according to the selection screen, and selects an utterance language and a translated utterance language (for example, translation from Japanese into English). The controller 14 thereby determines the utterance language and the translated utterance language, and performs setting so as to refer to the reference table for Japanese speech recognition, the Japanese-English translation dictionary, and the reference table for English speech synthesis, which are in the memory 12.

Next, the controller 14 cases the display 100 to display the operation screen for utterance start, such as the "utterance switch". The speaker operates the touch panel 101 according to the operation screen, and selects to make an utterance. The controller 14 thereby perceives that utterance is to be started, and performs the translation operation shown in FIG. 4.

When the utterance An of the speaker is input to the microphone 10, the microphone 10 generates an electrical signal (speech waveform) according to the utterance An of the speaker. The controller 14 inputs the electrical signal from the microphone 10, performs speech recognition to generate utterance data an (S11). The speech recognition is a technology of generating utterance data an from a speech waveform by extracting acoustic characteristics and linguistic characteristics of a speech from the speech waveform. Specifically, acoustic characteristics of a speech are extracted by using an acoustic model, and a combination of vocabularies that is more natural as a language is determined with respect to extracted phoneme data based on a language model, and finally utterance data is generated. The controller 14 analyzes the speech waveform indicated by the electrical signal, by using the acoustic model, and generates utterance data an of the character string from the characteristics of the analyzed speech waveform based on a Japanese language model. In the present embodiment, the speech recognition function of the controller 14 and the microphone 10 are an example of the input unit.

Next, the controller 114 translates the utterance data an to generate translated utterance data bn of the character string, and generates a degree of reliability αn of the translation result (S12). Specifically, referring to the Japanese-English translation dictionary, the controller 14 generates translated utterance data bn corresponding to the utterance data an.

While the translation dictionary is a dictionary on a per-sentence basis as described above, the controller 14 may perform replacement with respect to numerical data and proper nouns, such as person names and place names in each sentence. The controller 14 generates the degree of reliability αn of the translation result. The degree of reliability αn is information indicating the accuracy of the translation result. As a method of translation and a method for determining the degree of reliability of the translation result, known techniques such as BLEU and RIBES can be used.

Next, the controller 14 determines whether the degree of reliability αn of the translation result is more than or equal to a predetermined value (such as 60%) or not (S13). In the case where the degree of reliability αn is less than the predetermined value, the controller 14 does not output the translated utterance data bn, but temporarily stores the utterance data an and the translated utterance data bn in the memory 12. Then, the controller 14 determines whether the number of times n of the current utterance input reaches a predetermined number of times (S14). When the number of times n of the current utterance input does not reach the predetermined number of times (such as five times), the controller 14 notifies the speaker of the determination result, without outputting the translated utterance data bn (S15), and returns to step S11. Specifically, the controller 14 causes the LED 140 to illuminate red, without causing the speaker unit 16 to output a translated utterance Bn corresponding to the translated utterance data bn.

As described above, according to the present embodiment, if the degree of reliability αn of the translation result is low, being less than the predetermined value, the speaker is notified to the effect, and is urged to make an utterance again using a different expression. Further, according to the present embodiment, if the degree of reliability αn of the translation result is low, being below the predetermined value, output of translated utterance data bn is not autonomously performed Thus, the translated utterance Bn is not output if the translation result is inaccurate.

On the other hand, in step S13, when the degree of reliability αn is reached or exceeded the predetermined value, the controller 14 causes the LED 140 to illuminate green to notify the speaker that translated utterance data bn with high degree of reliability is obtained. Then, the controller 14 updates the translation dictionary, displays the translated utterance data bn, and outputs the translated utterance Bn from the speaker unit 16 (S16 to S18).

Specifically, the controller 14 associates all the pieces of utterance data a1 to an, which have been generated until the translated utterance data bn with the degree of reliability more than or equal to the predetermined value is obtained, with the translated utterance data bn, to update the translation dictionary in the memory 12 (S16).

As described above, according to the present embodiment, all the utterances of a speaker can be stored (learned) in association with the final translation result. Thus, a translation result is possible to be swiftly output at the next time (second or later time) of utterance, without requiring an utterance to be repeated.

Next, the controller 14 generates a text image for displaying the translated utterance data bn, and causes the display 100 to display the text image (S17). Additionally, the controller 14 may cause the display 100 to display all the translation records up to then (utterance data a1 to 1n, translated utterance data b1 to bn, degrees of reliability α1 to α1 of translation results).

Next, the controller 14 generates an electrical signal (speech waveform) by performing speech synthesis on the translated utterance data bn, and causes the speaker unit 16 to output the translated utterance Bn (audio data) according to the electrical signal (S18). One of a technique widely used as the method of speech synthesis is concatenative synthesis. The concatenative synthesis is a method of concatenating and synthesizing fragments of recorded speech waveforms, and is a current mainstream speech synthesis technique. Specifically, by referring to the reference table for English speech synthesis, the controller 14 generates an electrical signal converting the translated utterance data bn of the character string into a speech waveform. This electrical signal is converted into speech by the speaker unit 16 and is output as the translated utterance Bn. In the present embodiment, the speech synthesis function of the controller 14 and the speaker unit 16 are one example of the output unit.

When output of the translated utterance Bn is ended, the controller 14 ends the translation operation described above. Also in a case where the number of times n of the current utterance input reached or exceeded the predetermined number of times in step S14, the controller 14 ends the translation operation described above. When the translation operation is ended, the controller 14 causes the display 100 to display the operation screen for utterance start, such as the "utterance switch", or the selection screen for the utterance language and the translated utterance language to prepare for the next translation operation.

Figure 5:
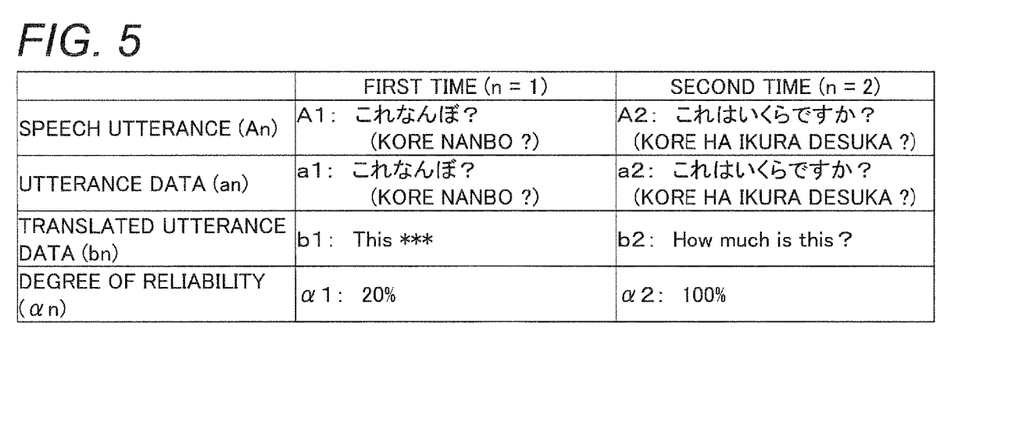
FIG. 5 is a diagram showing an example of the translation operation of the controller of the translation device according to the first embodiment.

In the following, a specific example of the translation operation of the controller 14 of the translation device 1 will be described. FIG. 5 is a diagram showing an example of the translation operation of the controller 14 of the translation device 1. FIG. 6A is a diagram showing an example of information in the translation dictionary before update, and FIG. 6B is a diagram showing an example of information in the translation dictionary after update. In this example, before update, only "Kore ha ikura desuka?" is registered in the translation dictionary as utterance data that is associated with translated utterance data "How much is this?", as shown in FIG. 6A.

As shown in FIG. 5, when a speaker's first (n=1) utterance A1 "Kore nanbo?" is input to the microphone 10, the microphone 10 and the controller 14 input the utterance A1 to perform speech recognition, and generate utterance data a1 "Kore nanbo?" (S11). Next, the controller 14 translates the utterance data a1 into translated utterance data b1 "This ***". At this time, the translated utterance data b1 is an incomplete translation according to the translation dictionary before update as shown in FIG. 6A, in which the utterance data a1 "Kore nanbo?" is not registered. Accordingly, the controller 14 generates a low degree of reliability α1 of the translation result, such as 20% (S12).

Next, because the degree of reliability α1 of the translation result is lower than the predetermined value (such as 60%) (S13), the controller 14 temporarily stores the utterance data a1 in the memory 12, without outputting the translated utterance data b1. At this time, because the number of times n of the current utterance input has not reached a predetermined number of times (such as five times) (S14), the controller 14 notifies the speaker of the determination result (S15) by causing the LED 140 to illuminate red, without outputting the translated utterance data b1, and returns to step S11.

Next, checking the red illumination of the TED 140 causes the speaker to recognize that the utterance A1 "Kore nanbo?" has not been translated with high accuracy, and an attempt is made for translation by a different expression. Then, when the speaker's second (n=2) utterance A2 "Kore ha ikura desuka?" is input to the microphone 10, the microphone 10 and the controller 14 input the utterance A2 to perform speech recognition, and generate utterance data a2 "Kore ha ikura desuka?" (S11). Next, the controller 14 translates the utterance data a2 into translated utterance data b2 "How much is this?". At this time, the translated utterance data b2 is a complete translation according to utterance data a2 "Kore ha ikura desuka?" which is registered in the translation dictionary before update as shown in FIG. 6A. Accordingly, the controller 14 generates a high degree, of 100%, of reliability α2 of the translation result (S12).

Next, because the degree of reliability α2 is more than or equal to the predetermined value (such as 60%) (S13), the controller 14 causes the LED 140 to illuminate green to notify the speaker that the translated utterance data b2 with the high degree of reliability has been obtained. Moreover, as shown in FIG. 6B, the controller 14 updates the translation dictionary in the memory 12 by associating, with the translated utterance data b2 "How much is this?", all the pieces of utterance data, a1 "Kore nanbo?" and a2 "Kore ha ikura desuka?", generated until the translated utterance data b2 with the degree of reliability more than or equal to the predetermined value was obtained (S16). Next, the controller 14 causes the display 100 to display the translated utterance data b2 (S17). Then, the controller 14 and the speaker unit 16 generate an electrical signal (speech waveform) by performing speech synthesis on the translated utterance data b2, and the speaker unit 16 is caused to output a translated utterance Bn (audio data) according to the electrical signal (S18). Translation and update of the translation dictionary are performed in the above manner.

<1-3. Effects>

As described above, according to the present embodiment, the translation device 1 includes the microphone 10, the controller 14, the LED 140, and the speaker unit 16. The microphone 10 inputs an utterance of a speaker to generate utterance data. The controller 14 determines the accuracy of a translation result when translated utterance data from the utterance data is obtained. The LED 140 notifies the speaker of the determination result of the controller 14. The speaker unit 16 outputs a translated utterance according to the translated utterance data. When the controller 14 determines that the accuracy of the translation result is lower than a predetermined value, the controller 14 controls the speaker unit 16 not to output the translated utterance, and controls the LED 140 to issue a notification regarding the determination result.

According to the translation device 1 of the present embodiment, when the degree of reliability (accuracy) αn of a translation result is lower than a predetermined value, the controller causes the LED 140 to illuminate red to thereby issue a notification regarding the determination result. Thus, the speaker can be urged (demanded) to make an utterance again using a different expression. Translation is thus performed several times, and the translation accuracy can be increased. Furthermore, the controller does not cause the speaker unit 16 to output a translated utterance Bn until the degree of reliability (accuracy) of the translation result reaches or exceeds the predetermined value. Thus, output of a translated utterance Bn which is an inaccurate translation result is avoided, and only a translated utterance Bn with a high translation accuracy is output.

In the present embodiment, the translation device 1 further includes the memory 12 storing a translation dictionary associating utterance data an with translated utterance data bn. The controller 14 performs translation based on the translation dictionary. When the controller 14 determines that the degree of reliability (accuracy) αn of a translation result is more than or equal to a predetermined value, the controller 14 updates the translation dictionary by associating, with translated utterance data bn for which the degree of reliability (accuracy) αn of the translation result is more than or equal to the predetermined value, all the pieces of utterance data a1 to an which is generated until the translated utterance data bn is obtained.

Accordingly, all the utterances of the speaker can be stored (learned) in association with the final translation result, and a translation result can be swiftly output at the next time (second or later time) of utterance, without requiring an utterance to be repeated. Thus, smooth conversation can be realized. The present embodiment is suitable for personally customized use of a translation device.

Alternatively, when the controller 14 determines that the degree of reliability (accuracy) αn of the translation result is more than or equal to the predetermined value, the controller 14 may update the translation dictionary by associating, with translated utterance data bn for which the degree of reliability (accuracy) αn of the translation result is more than or equal to the predetermined value, one or some pieces of utterance data among the pieces of utterance data a1 to an which is generated until the translated utterance data bn is obtained.

Second Embodiment

In the first embodiment, determination of translation accuracy is performed based on the degree of reliability αn of the translation result, which is provided at the time of translation. In a second embodiment, determination of translation accuracy is performed by comparing utterance data an with back-translated utterance data bnx, which is a back-translation result of back-translating, into the utterance language, translated utterance data bn which is the translation result.

The configuration of the translation device in the second embodiment is basically the same as the configuration in the first embodiment described with reference to FIG. 3, but the function and operation of the controller 14 are different from those described above.

Figure 7:
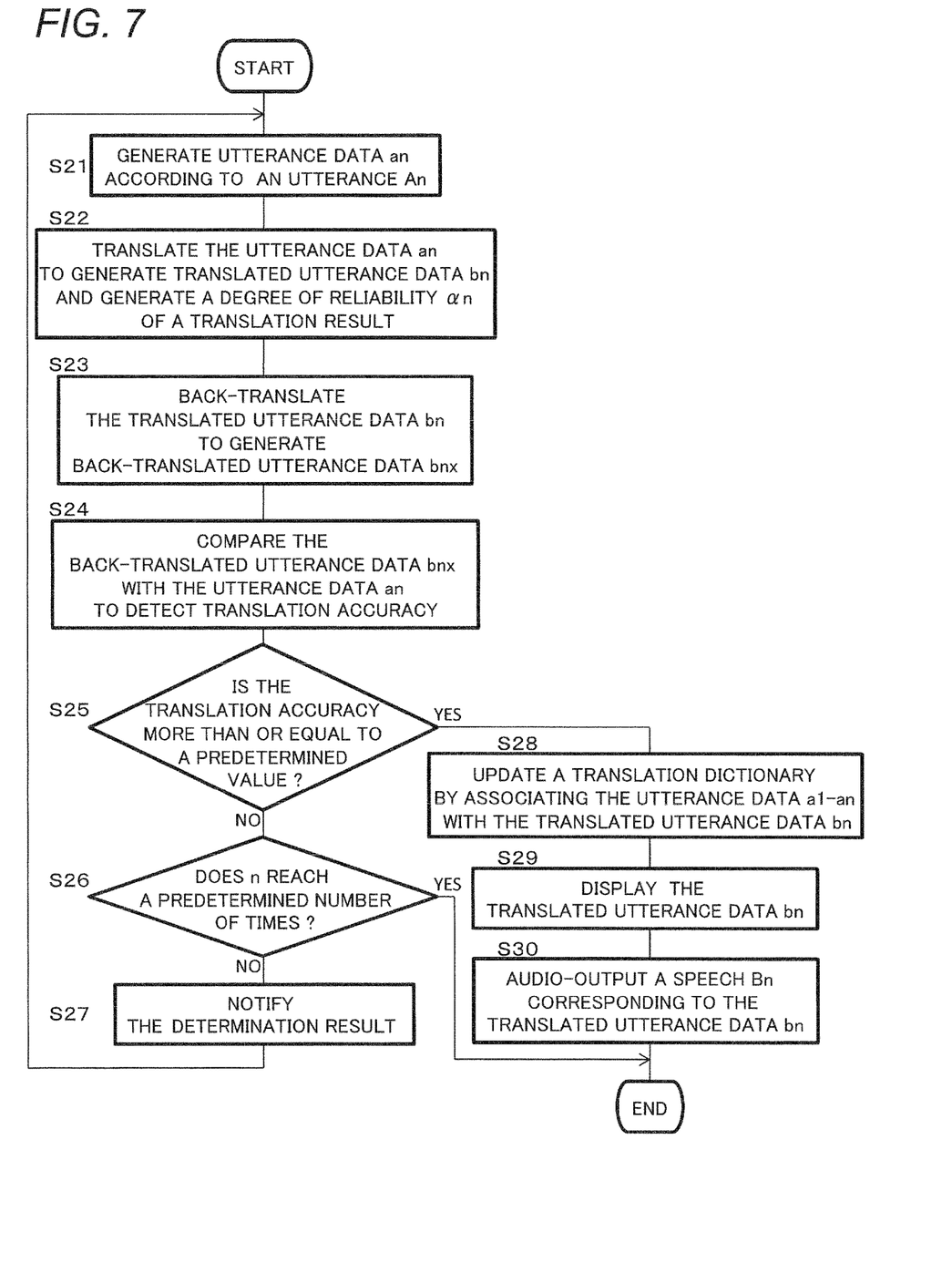
FIG. 7 is a flowchart of translation operation of a controller of a translation device according to a second embodiment.

Specific operation of the controller 14 according to the second embodiment will be described with reference to FIG. 7. FIG. 7 is a flowchart of translation operation of the controller 14 according to the second embodiment.

The operation in steps S21 and S22 is the same as the operation in steps S11 and S12 in the first embodiment shown in FIG. 4. That is, the controller 14 performs speech recognition on an utterance An of a speaker and generates utterance data an (S21), and generates translated utterance data bn of a character string by translating the utterance data an (S22).

Next, the controller 14 back-translates the translated utterance data bn into the utterance language (Japanese), to generate back-translated utterance data bnx of the character string (S23). Specifically, by referring to English-Japanese translation dictionary stored in the memory 12, the controller 14 generates back-translated utterance data bnx corresponding to the translated utterance data bn. The method of back-translation can be the same as the method of translation described above.

Next, the controller 14 compares the back-translated utterance data bnx with the utterance data an to detect the accuracy of the translation result regarding the translated utterance data (S24). Specifically, the controller 14 determines the accuracy of the translation result based on the degree of matching of each vocabulary (subject, predicate, object, complement, post-positional particle, and the like).

Next, the controller 14 determines whether the accuracy of the translation result is more than or equal to a predetermined value (such as 60%) or not (S25). When the accuracy is less than the predetermined value, the controller 14 temporarily stores the utterance data an, the translated utterance data bn, and the back-translated utterance data bnx in the memory 12, without outputting the translated utterance data bn.

The operation in steps S26 to S30 is the same as the operation in steps S14 to S18 in the first embodiment shown in FIG. 4. That is, the controller 14 determines whether the number of times n of current utterance input reaches a predetermined number of times (such as five times) (S26), and when the number of times n of the current utterance input does not reach the predetermined number of times, the controller 14 causes the LED 140 to illuminate red to notify the speaker of the determination result, without outputting the translated utterance data bn (S27), and returns to step S21.

On the other hand, when the accuracy of the translation result reaches or exceeds the predetermined value in step S25, the controller 14 associates all the pieces of utterance data a1 to an, which is generated until the translated utterance data bn with the degree of reliability more than or equal to the predetermined value is obtained, with the translated utterance data bn, and updates the translation dictionary in the memory 12 (S28). Next, the controller 14 generates a text image for displaying the translated utterance data bn, and causes the display 100 to display the text image (S29). Next, the controller 14 generates an electrical signal (speech waveform) by performing speech synthesis on the translated utterance data bn, and causes the speaker unit 16 to output a translated utterance Bn (audio data) according to the electrical signal (S30), and ends the translation operation.

The same advantages as those of the first embodiment may be achieved by the second embodiment.

Other Embodiments

The first and the second embodiments have been described above as illustration of the technology disclosed in the present application. However, the technology of the present disclosure is not limited thereto, and may be applied to embodiments achieved by making modifications, substitutions, additions, omissions and the like as appropriate. Also, construction elements described in the first and the second embodiments may be combined to achieve a new embodiment. In the following, other embodiments will be described.

(1) The operation of the controller 14 in the first and the second embodiments may be performed by a server device on a network. In this case, the translation dictionary for translation, and the reference tables for speech recognition and speech synthesis are stored in a memory of the server device. Moreover, a part of the operation of the controller 14 (such as the translation operation) may be performed by the server device on the network.

For example, an utterance An (audio data) of a speaker input via a microphone 10 at a terminal device is converted into speech data, and the speech data is transmitted from the terminal device to the server device over the network. The operation in steps S11 to S18 shown in FIG. 4 is performed by the server device. That is, the server device generates utterance data an by performing speech recognition on the received speech data (S11), and generates translated utterance data bn by translating the utterance data an (S12). When the degree of reliability αn of the translation result is lower than the predetermined value (S13), the server device notifies the terminal device to the effect over the network (S15). The terminal device causes an LED 140 to illuminate red to notify the speaker that the degree of reliability of the translation result is low, without outputting the translated utterance data bn.

On the other hand, when the degree of reliability αn of the translation result is more than or equal to the predetermined value (S13), the server device associates all the pieces of utterance data a1 to an, which is generated until the translated utterance data bn with the degree of reliability more than or equal to the predetermined value is obtained, with the translated utterance data bn, and updates the translation dictionary in the memory of the server device (S16). Then, the server device generates speech data by performing speech synthesis on the translated utterance data bn, and transmits the speech data to the terminal device over the network (S18). The terminal device then outputs a translated utterance Bn (audio data) according to the speech data from a speaker unit 16.

(2) The operation of the controller 14 in the first and the second embodiments may be performed by various appliances such as smartphones and tablets. In this case, programs that are executed by the controller 14 may be provided over a network or by being stored in a non-transitory computer-readable recording medium such as a CD-ROM, an HDD, or an SSD.

(3) In the first and the second embodiments, the controller 14 notifies a speaker of a determination result by causing the LED 140 to illuminate, but such notification may be performed by audio-output from the speaker unit or by display of a message, such as texts or pictures, on the display 100.

(4) In the first and the second embodiments, the controller 14 ends the translation operation when the number of times n of utterance input reaches a predetermined number of times; however, the translation operation may be ended when a predetermined period of time has passed from the time of the first utterance input. Also, the controller 14 may cause the display 100 to constantly display "utterance switch" (reset switch), and may end the translation operation and reset the state to a state where a first utterance is to be input, when an utterance switch (reset switch), on the touch panel 101, associated with the display "utterance switch" on the display 100 is operated.

Embodiments have been described above as illustration of the technology disclosed in the present disclosure. The appended drawings and the detailed description are provided for this purpose.

Accordingly, the construction elements shown in the appended drawings and described in the detailed description include not only construction elements that are essential for solving the problem but also construction elements that are not essential for solving the problem, for the purpose of illustration of the technology. Hence, that these non-essential construction elements are shown in the appended drawings and described in the detailed description does not cause these construction elements to be immediately recognized as being essential.

Furthermore, the embodiments described above are for illustrating the technology of the present disclosure, and various modifications, substitutions, additions, omissions and the like may be made within the scope of claims and equivalents to the claims.

The present disclosure is applicable to a translation device for translating an utterance (first language) into a translated utterance (second language different from the first language).

The invention claimed is:

1. A translation device comprising:
   an input device that inputs an utterance of a speaker to generate utterance data;
   a processor that determines accuracy of a translation result when translated utterance data from the utterance data is obtained;
   an annunciator that notifies, to the speaker, the determination result of the processor;
   an output device that outputs a translated utterance according to the translated utterance data;
   and a memory for storing a translation dictionary including sentence data and translation data associated with each other, the translation data being to be referenced in response to an input of the sentence data associated with the translation data in the translation dictionary,
   wherein the processor refers to the translation dictionary to obtain the translated utterance data, in response to the input of the utterance to the input device,
   during a time period in which the accuracy of the translation result is determined to be lower than a predetermined value, the processor controls the output device not to output the translated utterance, and controls the annunciator to issue a notification which prompts the speaker to make an additional utterance using a different expression, regarding the determination result, and
   once the accuracy of the translation result is determined to be equal to or greater than the predetermined value after the notification has been issued, the processor updates the translation dictionary by recording multiple utterance data respectively as the sentence data in the translation dictionary and recording final translated utterance data as the translation data to be referenced in response to a re-input of any one of the multiple utterance data, the multiple utterance data including all pieces of utterance data generated until the final translated utterance data is obtained, and the final translated utterance data being translated utterance data for which the accuracy of the translation result is determined to be equal to or greater than the predetermined value.

2. The translation device according to claim 1, wherein the processor generates a degree of reliability of the translation result of the translation device to determine the degree of reliability as the accuracy of the translation result.

3. The translation device according to claim 1,
   wherein the processor
      back-translates the translated utterance data into back-translated utterance data, and
      determines the accuracy of the translation result by comparing the back-translated utterance data with the utterance data.

4. The translation device according to claim 1, comprising a reset switch for allowing resetting to a state where a first utterance is able to be input.

5. A translation device comprising:
   a processor for translating utterance data according to an utterance of a speaker into translated utterance data, and for determining accuracy of a translation result;
   and a memory for storing a translation dictionary including sentence data and translation data associated with each other, the translation data being to be referenced in response to an input of the sentence data associated with the translation data in the translation dictionary, wherein the processor refers to the translation dictionary to obtain the translated utterance data, in response to input of the utterance, during a time period in which the accuracy of the translation result is determined to be lower than a predetermined value, the processor performs control such that a translated utterance according to the translated utterance data is not output, and performs control such that the speaker is prompted to make an additional utterance using a different expression by notification of a determination result, and once the accuracy of the translation result is determined to be equal to or greater than the predetermined value after the notification, the processor updates the translation dictionary by recording multiple utterance data respectively as the sentence data in the translation dictionary and recording final translated utterance data as the translation data to be referenced in response to a re-input of any one of the multiple utterance data, the multiple utterance data including all pieces of utterance data generated until the final translated utterance data is obtained, and the final translated utterance data being translated utterance data for which the accuracy of the translation result is determined to be equal to or greater than the predetermined value.

6. A non-transitory computer-readable recording medium storing a program for causing a computer to perform steps of:

translating utterance data according to an utterance of a speaker into translated utterance data by referring to a translation dictionary to obtain the translated utterance data, the translation dictionary including sentence data and translation data associated with each other, the translation data being to be referenced in response to an input of the sentence data associated with the translation data in the translation dictionary;

determining accuracy of a translation result;

performing control, during a time period in which the accuracy of the translation result is determined to be lower than a predetermined value, such that a translated utterance according to the translated utterance data is not output, and such that the speaker is prompted to make an additional utterance using a different expression by notification of a determination result; and once the accuracy of the translation result is determined to be equal to or greater than the predetermined value after the notification, updating the translation dictionary by recording multiple utterance data respectively as the sentence data in the translation dictionary and recording final translated utterance data as the translation data to be referenced in response to a re-input of any one of the multiple utterance data, the multiple utterance data including all pieces of utterance data generated until the final translated utterance data is obtained, and the final translated utterance data being translated utterance data for which the accuracy of the translation result is determined to be equal to or greater than the predetermined value.

* * * * *